W. A. ASHLEY.
FITTING FOR DOMESTIC GAS METERS.
APPLICATION FILED JUNE 13, 1919.
1,350,132.
Patented Aug. 17, 1920.
2 SHEETS—SHEET 2.
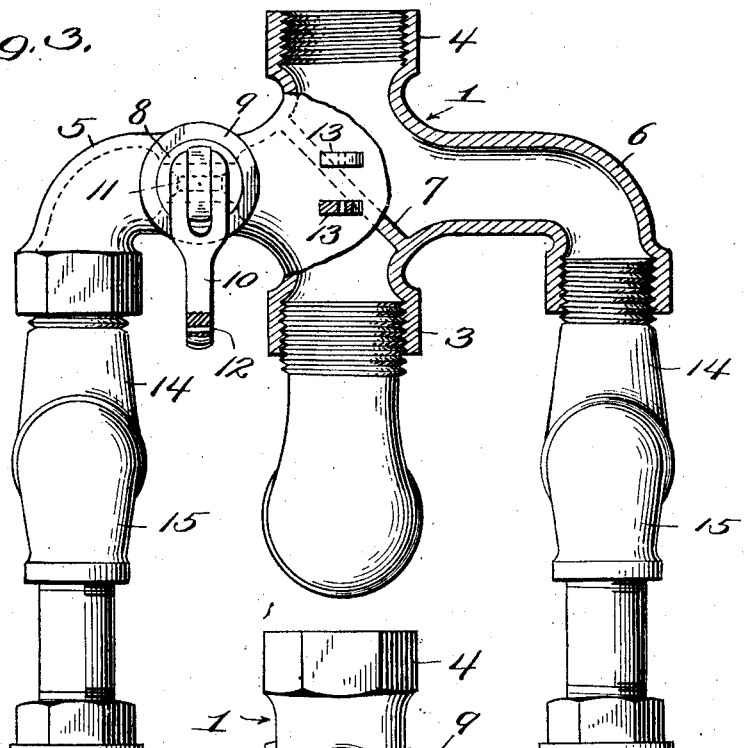
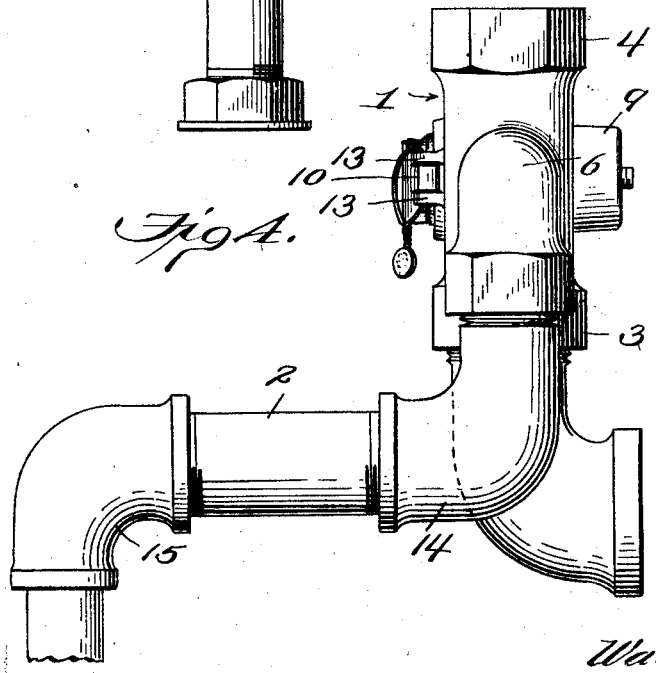
Inventor
Walter A. Ashley
Witness

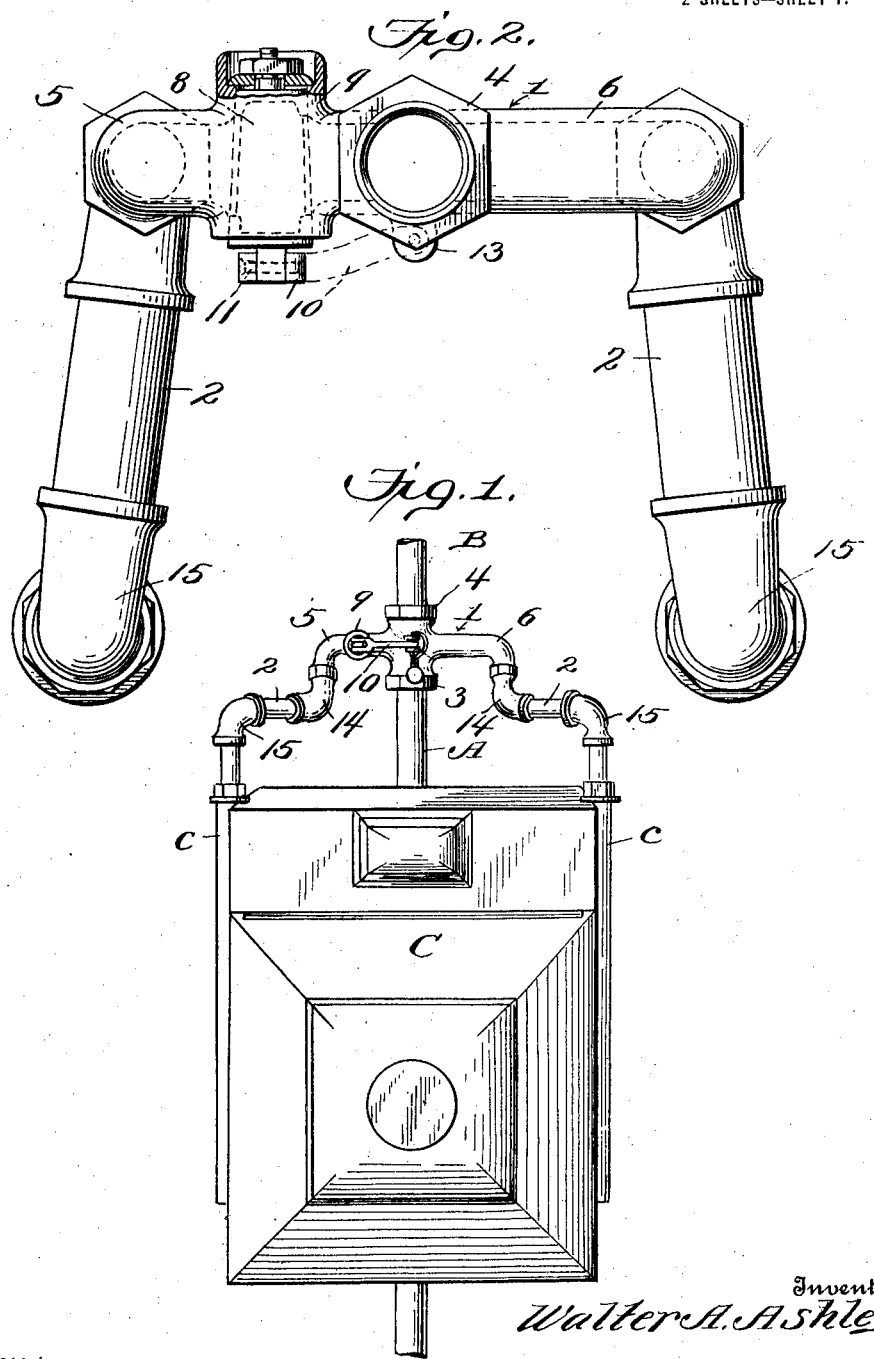

UNITED STATES PATENT OFFICE.

WALTER A. ASHLEY, OF CHILLICOTHE, OHIO.

FITTING FOR DOMESTIC GAS-METERS.

1,350,132.  Specification of Letters Patent.  Patented Aug. 17, 1920.

Application filed June 13, 1919. Serial No. 303,888.

*To all whom it may concern:*

Be it known that I, WALTER A. ASHLEY, a citizen of the United States, residing at Chillicothe, in the county of Ross and State of Ohio, have invented new and useful Improvements in Fittings for Domestic Gas-Meters, of which the following is a specification.

This invention relates to a fitting for use in the connection of domestic gas meters to the service and distributing pipes.

The principal objects of the invention are to improve the installation of domestic meters, both by facilitating the work and also by eliminating any possibility of the springing of the meter horns or the service and distributing pipes with resultant defective jointure and possible leakage; and to provide a fitting which shall adequately serve as a support for the meter, which shall be adaptable to meters of varying sizes or capacities; whose horns may be spaced apart at varying distances; and which shall also be adaptable, within all practical limits to different locations of the meter relatively to the service and distributing pipes, as may be required by the exigencies of a particular situation.

With the above objects in view, the invention consists generally in a fitting which has connections for jointure to the service and distributing pipes and to the meter horns in conjunction with certain novel features of structure and combination which will be set forth as the description proceeds.

An embodiment of the invention is illustrated in the accompanying drawings, wherein:—

Figure 1 is a view in front perspective showing a fitting in which the features of the invention are incorporated in its practical application to a domestic meter.

Fig. 2 is a plan view, with parts shown in section, of the fitting.

Fig. 3 is a view, partly in front elevation and partly in central cross-section, of the same.

Fig. 4 is a side elevation of the same.

Similar characters of reference designate corresponding parts throughout the several views.

The essential parts of the fittings are a relatively stationary manifold 1 and a pair of laterally adjustable coupling pipes 2.

The manifold 1 is formed with connections 3 and 4 for jointure to the service and distributing pipes A and B, respectively, and with arms 5 and 6 which are connected by the pipes 2 to the respective horns $c$ of the meter C. The connections 3 and 4 are separated from one another by a web or partition 7 formed within the body 1 whereby direct communication is established, on the one hand, between the connection 3 and the arm 5, and, on the other hand, between the arm 6 and the connection 4; and thereby the gas is caused to pass from the service pipe A through the arm 5 into the meter and from the meter through the arm 6 and connection 4 to the distributing pipe B.

A cut-off valve 8 of any suitable construction may be arranged in the arm 5, which, in such case, will be fashioned with a casing 9 for said valve. As shown, the valve 8 is an ordinary turning plug having at one end an operating handle 10; and in order that the valve may be sealed in its closed position, said handle is mounted to swing on a pivot 11 and has a terminal aperture 12, while the manifold is provided with a pair of apertured ears 13 between which the end of the handle 10 may be introduced when the valve is closed so that a wire whose ends are sealed (or it might be the shackle of a padlock) may be passed through the alining apertures of the ears 13 and the aperture 12.

According to the invention the pipes 2 are connected to the arms 5 and 6 for lateral swinging movement. In the construction preferred, said arms have their terminals directed downward and internally threaded for the connection of said pipes; these project horizontally and have at their inner ends elbows or angle pieces 14 whose upwardly directed portions are threaded for their connection with the down-turned terminals of the arms 5 and 6. As thus connected to said arms the pipes 2 may be swung laterally in either direction independently of one another through an arch which, for practical purposes, will have a range of 90° more or less. At their outer ends the pipes 2 may have suitable couplings 15 for their connection to the meter horns $c$, and by virtue of their capacity for lateral adjustment they may be fitted to meter horns which, in different constructions or sizes of meters, may be spaced apart at varying distances. Moreover, and also by virtue of their capacity for lateral adjustment, the arms 2 are adaptable to the location of the meter either in a central position, that is to say, squarely in front of the pipes A and B, as shown in Fig. 1, or in positions at one side or the other of said central position, accordingly as the exigencies of a particular installation may require.

The relation of the coupling piece 2 to the manifold 1, as described, that is to say, the connection of said pipes from below to the down-turned terminals of the arms 5 and 6, renders the manifold available as a support for the meter, in which function it will have all necessary strength and stability and will eliminate the necessity of the special supporting bracket which is usually required.

It will, of course, be apparent that the connections 3 and 4 may be joined either directly to the pipes A and B or through the agency of angle fittings or elbows as the relative arrangement of said pipes in a particular case may require. In any event, the installation of the meter is greatly facilitated and the adaptability of the manifold to the pipes A and B and to meters whose horns may be spaced apart at varying distances insures that the connections may be made with the utmost security and ease and without the necessity or liability of springing any of the parts, such as the horns of the meter or the terminals of the pipes A and B.

As shown and preferred, the connections 3 and 4 are located centrally of the manifold and in diametrically opposite relation and the axes of said connections and of the arms 5 and 6 are in a common plane transverse to the manifold. However, resort may be had to such modifications of the manifold structure shown and also of the connections between the arms 5 and 6 and the pipes 2 as may preserve the features of structure and combination above described, and as fall within the scope of the appended claims.

Having fully described my invention, I claim—

1. A fitting for fluid meters comprising a manifold having a central portion provided with inlet and outlet passages and a web separating said passages and having arms projecting from said central portion at opposite sides of said web, said arms having down-turned connecting portions and having their axes in a common plane with the axes of said passages, coupling pipes connected to said arms adapted to swing about the connecting portions thereof, and means for connecting said pipes when in adjusted position, to the inlet and outlet of the meter respectively.

2. A fitting for fluid meters including a manifold having a central portion provided with inlet and outlet passages and a web separating said passages and having arms projecting from said central portion at opposite sides of said web, said arms having down-turned connecting portions, and means for suspending and supporting the fluid meter from said manifold including coupling pipes adapted to swing about the connecting portions of said arms, and rigid connections between said coupling pipes and the inlet and outlet of the meter respectively.

3. A fitting for fluid meters including a manifold having a central portion provided with inlet and outlet passages and a web integral with said central portion for separating said passages, arms formed integral with said central portion and projecting therefrom at opposite sides of said web to provide a continuation of said passages, a valve plug mounted in an opening in one of said arms for opening and closing the inlet passage, an apertured handle pivotally attached to said valve, and apertured ears secured to said central portion for receiving said apertured handle whereby the valve may be sealed in closed position.

4. A fitting for fluid meters comprising an integral manifold having a central portion provided with inlet and outlet passages and a web separating said passages and having arms projecting from said central portion at opposite sides of said web, said arms having angularly disposed terminal connecting portions, and means for supporting the fluid meter from said manifold including coupling pipes adapted to swing about the terminal connecting portions of said arms, and rigid connections between said coupling pipes and the inlet and outlet of the meter, respectively.

In testimony whereof I have hereunto set my hand in presence of two subscribing witnesses.

WALTER A. ASHLEY.

Witnesses:
JOHN L. FLETCHER,
JAMES L. NORRIS.